US012617241B2

(12) United States Patent (10) Patent No.: US 12,617,241 B2

Nagasawa (45) Date of Patent: May 5, 2026

(54) TIRE

(71) Applicant: The Yokohama Rubber Co., LTD., Tokyo (JP)

(72) Inventor: Hideki Nagasawa, Kanagawa (JP)

(73) Assignee: The Yokohama Rubber Co., LTD., Tokyo (JP)

( * ) Notice: Subject to any disclaimer, the term of this patent is extended or adjusted under 35 U.S.C. 154(b) by 0 days.

(21) Appl. No.: 17/448,592

(22) Filed: Sep. 23, 2021

(65) Prior Publication Data

US 2022/0097459 A1 Mar. 31, 2022

(30) Foreign Application Priority Data

Sep. 30, 2020 (JP) ................................. 2020-165321

(51) Int. Cl.
B60C 11/12 (2006.01)
B60C 11/03 (2006.01)

(52) U.S. Cl.
CPC ...... B60C 11/1236 (2013.01); B60C 11/1272 (2013.01); *B60C 2011/0346* (2013.01);
(Continued)

(58) Field of Classification Search
CPC ............. B60C 11/1204; B60C 11/1218; B60C 11/1263; B60C 11/1281;
(Continued)

(56) References Cited

U.S. PATENT DOCUMENTS 8,267,131 B2 * 9/2012 Ikeda ................... B60C 11/1236
152/209.27
9,022,083 B2 * 5/2015 Voss .................... B60C 11/0306
152/DIG. 3
(Continued)

FOREIGN PATENT DOCUMENTS

EP 602989 A1 * 6/1994 ......... B60C 11/0309
EP 2191984 A2 * 6/2010 ......... B60C 11/0323
(Continued)

OTHER PUBLICATIONS

Machine Translation FR 3058927 (Year: 2018).*
(Continued)

*Primary Examiner* — Katelyn W Smith
*Assistant Examiner* — Wendy L Boss
(74) *Attorney, Agent, or Firm* — Thorpe North & Western

(57) ABSTRACT

A tire, in which a groove width that opens to a road contact surface of a tread portion is greater than 1.0 mm and 4.0 mm or less, includes: one or more circumferential narrow grooves extending in a tire circumferential direction; and a plurality of sipes communicating with the circumferential narrow groove. The circumferential narrow groove includes: a widened portion provided in a region in which a groove depth from the surface of the tread portion is 30% or more of a maximum groove depth and having a widened groove width; and a plurality of notch portions provided at intervals in the tire circumferential direction to bulge toward one side in a tire width direction to communicate from the surface of the tread portion to the widened portion. The sipes are connected to the notch portions.

15 Claims, 11 Drawing Sheets

(52) U.S. Cl.
CPC .................. *B60C 2011/0348* (2013.01); *B60C 2011/0353* (2013.01); *B60C 2011/0355* (2013.01); *B60C 2011/1209* (2013.01)

(58) Field of Classification Search
CPC ..... B60C 2011/1346; B60C 2011/0348; B60C 2011/0353; B60C 2011/0355; B60C 2011/1227; B60C 2011/1286; B60C 2011/129; B60C 11/042; B60C 2011/1295
See application file for complete search history.

(56) References Cited

U.S. PATENT DOCUMENTS

| | | | | |
|---|---|---|---|---|
| 11,267,290 | B2 | 3/2022 | Hirosue | |
| 2003/0094227 | A1* | 5/2003 | Bettiol | B60C 11/01 152/209.18 |
| 2011/0277898 | A1* | 11/2011 | Barraud | B60C 11/032 152/209.18 |
| 2012/0234443 | A1* | 9/2012 | Kurokawa | B60C 11/1281 152/209.18 |
| 2013/0160909 | A1 | 6/2013 | Atake | |
| 2014/0299244 | A1 | 10/2014 | Okabe | |
| 2016/0039249 | A1* | 2/2016 | Takahashi | B60C 11/0083 152/209.15 |
| 2016/0185162 | A1* | 6/2016 | Kaji | B29D 30/68 425/28.1 |
| 2017/0174008 | A1* | 6/2017 | Marlier | B60C 11/11 |
| 2018/0134090 | A1 | 5/2018 | Kagimoto | |
| 2018/0312008 | A1* | 11/2018 | Saeki | B60C 11/0304 |
| 2019/0337339 | A1* | 11/2019 | Osawa | B60C 11/0302 |
| 2019/0359002 | A1 | 11/2019 | Hirosue | |
| 2020/0055349 | A1* | 2/2020 | Durand-Gasselin | B60C 11/1218 |
| 2021/0260929 | A1 | 8/2021 | Takunaga | |

FOREIGN PATENT DOCUMENTS

| | | | | | |
|---|---|---|---|---|---|
| EP | 3882053 | A1 | | 5/2020 | |
| FR | 3058927 | A1 | * | 5/2018 | ............. B60C 11/04 |
| JP | 2002211211 | A | | 7/2002 | |
| JP | 2004351970 | A | * | 12/2004 | ......... B60C 11/0318 |
| JP | 2009-255765 | A | | 11/2009 | |
| JP | 2013132966 | A | | 7/2013 | |
| JP | 2014-097697 | A | | 5/2014 | |
| JP | 2014201166 | A | | 10/2014 | |
| JP | 2016-020111 | A | | 2/2016 | |
| JP | 2018-076039 | A | | 5/2018 | |
| JP | 2018144656 | A | | 9/2018 | |
| JP | 2018-529565 | A | | 10/2018 | |
| JP | 2019202679 | A | | 11/2019 | |
| JP | 2020-026222 | A | | 2/2020 | |
| JP | 2020078970 | A | | 5/2020 | |
| KR | 2007097828 | A | * | 10/2007 | ............. B60C 11/11 |
| WO | WO-2017040007 | A1 | * | 3/2017 | ......... B60C 11/0302 |

OTHER PUBLICATIONS

Machine Translation JP 2004351970 (Year: 2004).*
KR-2007097828 Machine Translation (Year: 2007).*
EP-2191984 Machine Translation (Year: 2010).*

* cited by examiner

TIRE WIDTH DIRECTION

TIRE RADIAL DIRECTION

| | Conventional Example | Example 1 | Example 2 | Example 3 | Example 4 |
|---|---|---|---|---|---|
| Groove width W1 (mm) of circumferential narrow main groove | 0.8 | 2.0 | 2.0 | 2.0 | 2.0 |
| Depth position (%) of widening starting point relative to maximum groove depth H1 | 53 | 40 | 40 | 40 | 40 |
| Presence/absence of notch portion bulging toward one side with circumferential narrow main groove interposed | Absent | Present | Present | Present | Present |
| Presence/absence of sipes connected to notch portion | Present | Present | Present | Present | Present |
| Opening area (mm²) of notch portion | 12.6 | 5.0 | 5.0 | 5.0 | 5.0 |
| Wa/W1 | 7.5 | 5.0 | 2.0 | 2.0 | 1.0 |
| Number of notch portions in ground contact surface (per circumferential narrow groove) | - | 8 | 8 | 13 | 13 |
| Nin/Nout | 1.0 | 0.15 | 0.2 | 0.2 | 0.8 |
| W2/W1 | 9.0 | 4.1 | 4.1 | 4.1 | 4.1 |
| Wa/Wb | 0.8 | 0.3 | 0.4 | 0.4 | 0.5 |
| Presence/absence of sipes connected to widened portion | Present | Absent | Absent | Absent | Absent |
| Presence/absence of widened sipes | Absent | Absent | Absent | Absent | Absent |
| TWc/TW | 0.52 | 0.40 | 0.40 | 0.40 | 0.40 |
| Groove shape of circumferential narrow groove | Straight | Straight | Straight | Straight | Straight |
| Zigzag shape: presence/absence of long portion and short portion | Absent | Absent | Absent | Absent | Absent |
| Presence/absence of notch portion and sipe on convex side of intersection point of long portion and short portion | Absent | Absent | Absent | Absent | Absent |
| Presence/absence of one or more notch portions and sipes on both sides in width direction of long portion | Absent | Absent | Absent | Absent | Absent |
| L2/P2 | Absent | Absent | Absent | Absent | Absent |
| N2/N1 | 1.0 | 1.0 | 1.0 | 1.0 | 1.0 |
| Rolling resistance (index value) | 100 | 103 | 105 | 105 | 105 |
| Wet braking (index value) | 100 | 102 | 102 | 105 | 107 |

FIG. 9A

| | Example 5 | Example 6 | Example 7 | Example 8 | Example 9 | Example 10 |
|---|---|---|---|---|---|---|
| Groove width W1 (mm) of circumferential narrow main groove | 2.0 | 2.0 | 2.0 | 2.0 | 2.0 | 2.0 |
| Depth position (%) of widening starting point relative to maximum groove depth H1 | 40 | 40 | 40 | 40 | 40 | 40 |
| Presence/absence of notch portion bulging toward one side with circumferential narrow main groove interposed | Present | Present | Present | Present | Present | Present |
| Presence/absence of sipes connected to notch portion | Present | Present | Present | Present | Present | Present |
| Opening area (mm²) of notch portion | 5.0 | 5.0 | 5.0 | 5.0 | 5.0 | 5.0 |
| Wa/W1 | 1.0 | 1.0 | 1.0 | 1.0 | 1.0 | 1.0 |
| Number of notch portions in ground contact surface (per circumferential narrow groove) | 13 | 13 | 13 | 13 | 13 | 13 |
| Nin/Nout | 0.8 | 0.8 | 0.8 | 0.8 | 0.8 | 0.8 |
| W2/W1 | 2.0 | 2.0 | 2.0 | 2.0 | 2.0 | 2.0 |
| Wa/Wb | 0.7 | 0.7 | 0.7 | 0.7 | 0.7 | 0.7 |
| Presence/absence of sipes connected to widened portion | Absent | Present | Present | Present | Present | Present |
| Presence/absence of widened sipes | Absent | Absent | Present | Present | Present | Present |
| TWc/TW | 0.40 | 0.40 | 0.40 | 0.55 | 0.55 | 0.55 |
| Groove shape of circumferential narrow groove | Straight | Straight | Straight | Straight | Straight | Zigzag |
| Zigzag shape: presence/absence of long portion and short portion | Absent | Absent | Absent | Absent | Absent | Absent |
| Presence/absence of notch portion and sipe on convex side of intersection point of long portion and short portion | Absent | Absent | Absent | Absent | Absent | Absent |
| Presence/absence of one or more notch portions and sipes on both sides in width direction of long portion | Absent | Absent | Absent | Absent | Absent | Absent |
| L2/P2 | Absent | Absent | Absent | Absent | Absent | 0.85 |
| N2/N1 | 1.0 | 1.0 | 1.0 | 1.0 | 2.0 | 1.0 |
| Rolling resistance (index value) | 106 | 106 | 106 | 108 | 110 | 108 |
| Wet braking (index value) | 107 | 110 | 112 | 112 | 112 | 115 |

FIG. 9B

| | Example 11 | Example 12 | Example 13 | Example 14 | Example 15 |
|---|---|---|---|---|---|
| Groove width W1 (mm) of circumferential narrow main groove | 2.0 | 2.0 | 2.0 | 2.0 | 2.0 |
| Depth position (%) of widening starting point relative to maximum groove depth H1 | 40 | 40 | 40 | 40 | 40 |
| Presence/absence of notch portion bulging toward one side with circumferential narrow main groove interposed | Present | Present | Present | Present | Present |
| Presence/absence of sipes connected to notch portion | Present | Present | Present | Present | Present |
| Opening area (mm²) of notch portion | 5.0 | 5.0 | 5.0 | 5.0 | 5.0 |
| Wa/W1 | 1.0 | 1.0 | 1.0 | 1.0 | 1.0 |
| Number of notch portions in ground contact surface (per circumferential narrow groove) | 13 | 13 | 13 | 13 | 13 |
| Nin/Nout | 0.8 | 0.8 | 0.8 | 0.8 | 0.8 |
| W2/W1 | 2.0 | 2.0 | 2.0 | 2.0 | 2.0 |
| Wa/Wb | 0.7 | 0.7 | 0.7 | 0.7 | 0.7 |
| Presence/absence of sipes connected to widened portion | Present | Present | Present | Present | Present |
| Presence/absence of widened sipes | Present | Present | Present | Present | Present |
| TWc/TW | 0.55 | 0.55 | 0.55 | 0.55 | 0.55 |
| Groove shape of circumferential narrow groove | Zigzag | Zigzag | Zigzag | Zigzag | Zigzag |
| Zigzag shape: presence/absence of long portion and short portion | Present | Present | Present | Present | Present |
| Presence/absence of notch portion and sipe on convex side of intersection point of long portion and short portion | Absent | Present | Present | Present | Present |
| Presence/absence of one or more notch portions and sipes on both sides in width direction of long portion | Absent | Absent | Present | Present | Present |
| L2/P2 | 0.85 | 0.85 | 0.85 | 0.92 | 0.92 |
| N2/N1 | 1.0 | 1.0 | 1.0 | 1.0 | 1.5 |
| Rolling resistance (index value) | 108 | 108 | 108 | 108 | 109 |
| Wet braking (index value) | 117 | 118 | 119 | 120 | 120 |

FIG. 9C

TIRE

CROSS-REFERENCE TO RELATED APPLICATIONS

This application claims priority pursuant to 35 U.S.C. 119(a) to Japanese Patent Application No. 2020-165321, filed Sep. 30, 2020, which application is incorporated herein by reference in its entirety.

TECHNICAL FIELD

The present technology relates to a tire provided with a circumferential narrow groove having a widened portion with a widened groove width at the groove bottom.

BACKGROUND ART

In recent years, in order to improve the rolling resistance coefficient (RRC; Rolling Resistance Coefficient), a tire having a tread portion in which a rib-based block pattern is formed by dividing a rib row defined by a plurality of circumferential narrow grooves into lug narrow grooves or sipes and in which block rows are concentrated in a center portion has been sought. In this type of tire, due to the circumferential narrow grooves, the groove volume decreases and wet traction performance is deteriorated. Therefore, a tire has been proposed in which a widened portion having a widened groove width is formed at the groove bottom portion of the circumferential narrow groove to ensure the groove volume to thereby ensure the wet traction performance (for example, see Japan Unexamined Patent Publication No. 2018-529565).

However, when the sipes are to be connected to the circumferential narrow groove, in order to maintain the strength of a mold for molding the tire, it is necessary to provide a reinforcing portion in the connection portion between the circumferential narrow groove and the sipe in the mold. Therefore, a duct, which is a space corresponding to the reinforcing portion of the mold, is formed in the connection portion of the circumferential narrow groove with the sipe of the tire so as to extend in the thickness direction of the tread portion. However, in the conventional configuration, due to the duct, problems such as a decrease in the ground contact area of the tread portion and deterioration in the rolling resistance due to a decrease in block rigidity are anticipated, and there is sufficient room for improvement.

SUMMARY

The present technology provides a tire that can improve wet traction performance and reduce rolling resistance in a compatible manner.

A tire according to an embodiment of the present technology is a tire in which a groove width of an opening portion open to a surface of a tread portion is greater than 1.0 mm and 4.0 mm or less, the tire including: one or more circumferential narrow grooves extending in a tire circumferential direction; and a plurality of width-direction sipes communicating with the circumferential narrow grooves, at least one of the circumferential narrow grooves including: a widened portion provided in a region in which a groove depth from the surface of the tread portion is 30% or more of a maximum groove depth and having a groove width wider than the opening portion; and a plurality of notch portions provided at intervals in the tire circumferential direction to bulge toward one side in a tire width direction to communicate from the surface of the tread portion to the widened portion, and the width-direction sipe being connected to at least one of the notch portions.

In the tire, preferably, an opening area of the notch portion in the surface of the tread portion is 1.5 mm$^2$ or more and 10.0 mm$^2$ or less.

In the tire, preferably, a width Wa of the notch portion and a groove width W1 of the opening portion are in a range of $0.5 \leq (Wa/W1) \leq 2.0$.

In the tire, preferably, the number of the notch portions provided in one circumferential narrow groove is 10 or more and 20 or less in a ground contact surface of the tread portion.

In the tire, preferably, a ratio of the number of the notch portions bulging toward an inner side to the number of the notch portions bulging toward an outer side in the tire width direction of the circumferential narrow groove, among the notch portions provided in one circumferential narrow groove, is 0.2 or more and 1.0 or less.

In the tire, preferably, a maximum groove width W2 of the widened portion and a groove width W1 of the opening portion are in a range of $1.0 < (W2/W1) \leq 4.0$, and a width Wb from the opening portion to the widened portion and a width Wa of the notch portion are in a range of $0.5 \leq (Wa/Wb) \leq 2.0$.

In the tire, preferably, a groove depth H4 of the width-direction sipe satisfies a relationship of $H3 < H4 < 0.9$ H1, with respect to: a depth H3 from the surface of the tread portion in the circumferential narrow groove to a connection portion between the notch portion and the widened portion; and a maximum groove depth H1 of the circumferential narrow groove.

In the tire, preferably, the width-direction sipe is provided with a widened sipe with a widened width at a groove bottom, and a maximum width and a height from a bottom surface of the widened sipe are 1.2 times or more and 3.0 times or less of a groove width on the surface of the tread portion.

In the tire, preferably, a pair of circumferential main grooves extending in the tire circumferential direction are disposed in the tread portion on the outer side in the tire width direction with the circumferential narrow groove interposed therebetween, and a groove width W4 of the circumferential main groove with respect to a ground contact width TW of the tread portion is in a range of 3.0% or more and 5.0% or less, and a width TWc in the tire width direction of a land portion defined by the pair of circumferential main grooves and the ground contact width TW are in a range of $0.50 \leq (TWc/TW) \leq 0.60$.

In the tire, preferably, all the circumferential narrow grooves have a zigzag shape that is repeatedly and alternately bent in the tire width direction while extending in the tire circumferential direction.

In the tire, preferably, the circumferential narrow groove having the zigzag shape is formed by alternately connecting a long portion and a short portion.

In the tire, preferably, at least one notch portion is provided on a convex side of an intersection point of the long portion and the short portion.

In the tire, preferably, one or more notch portions are provided in one long portion and bulge toward each of the outer side and the inner side in the tire width direction.

In the tire, preferably, a pitch length P2 of the circumferential narrow groove having the zigzag shape and a length L2 of the long portion in the tire circumferential direction are in a range of $0.85 \leq (L2/P2) \leq 1.00$.

In the tire, preferably, a pair of circumferential main grooves extending in the tire circumferential direction are disposed in the tread portion on the outer side in the tire width direction with the plurality of circumferential narrow grooves interposed therebetween, a first land portion defined by the plurality of circumferential narrow grooves is provided between the pair of circumferential main grooves, a second land portion is defined by the circumferential narrow groove and the circumferential main groove, and the number N1 of first blocks dividing the first land portion by the width-direction sipe and being aligned in the tire circumferential direction and the number N2 of second blocks dividing the second land portion by the width-direction sipe and being aligned in the tire circumferential direction are in a range of $1.2 \leq (N2/N1) \leq 2.0$.

According to the present technology, the circumferential narrow groove includes a widened portion provided in a region in which a groove depth from the surface of the tread portion is 30% or more of a maximum groove depth and having a groove width wider than the opening portion, and a plurality of notch portions provided at intervals in the tire circumferential direction to bulge toward one side in a tire width direction to communicate from the surface of the tread portion to the widened portion, and the width-direction sipe is connected to at least one of the notch portions. Therefore, it is possible to improve the wet traction performance and reduce the rolling resistance in a compatible manner.

BRIEF DESCRIPTION OF DRAWINGS

FIGS. 9A-9C include a table showing the results of performance tests of pneumatic tires according to the present embodiment.

DETAILED DESCRIPTION

Embodiments of the present technology are described in detail below with reference to the drawings. A pneumatic tire according to the present embodiment is, for example, a pneumatic tire for vehicles traveling a long distance such as a truck. However, the present technology is not limited by the embodiment. Constituents of the following embodiments include elements that are essentially identical or that can be substituted or easily conceived of by a person skilled in the art.

Figure 1:
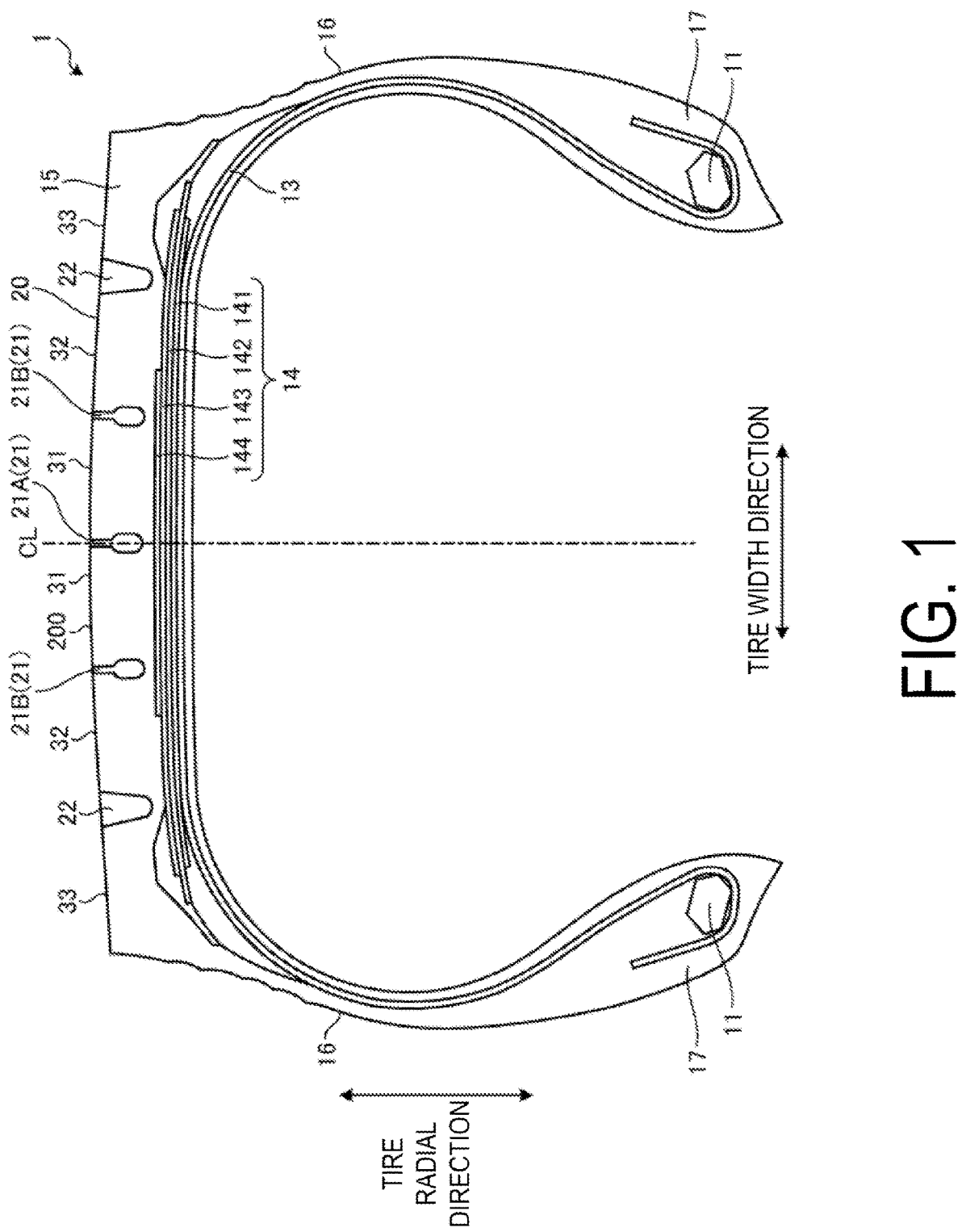
FIG. 1 is a meridian cross-sectional view illustrating main parts of a pneumatic tire according to the present embodiment.
Figure 2:
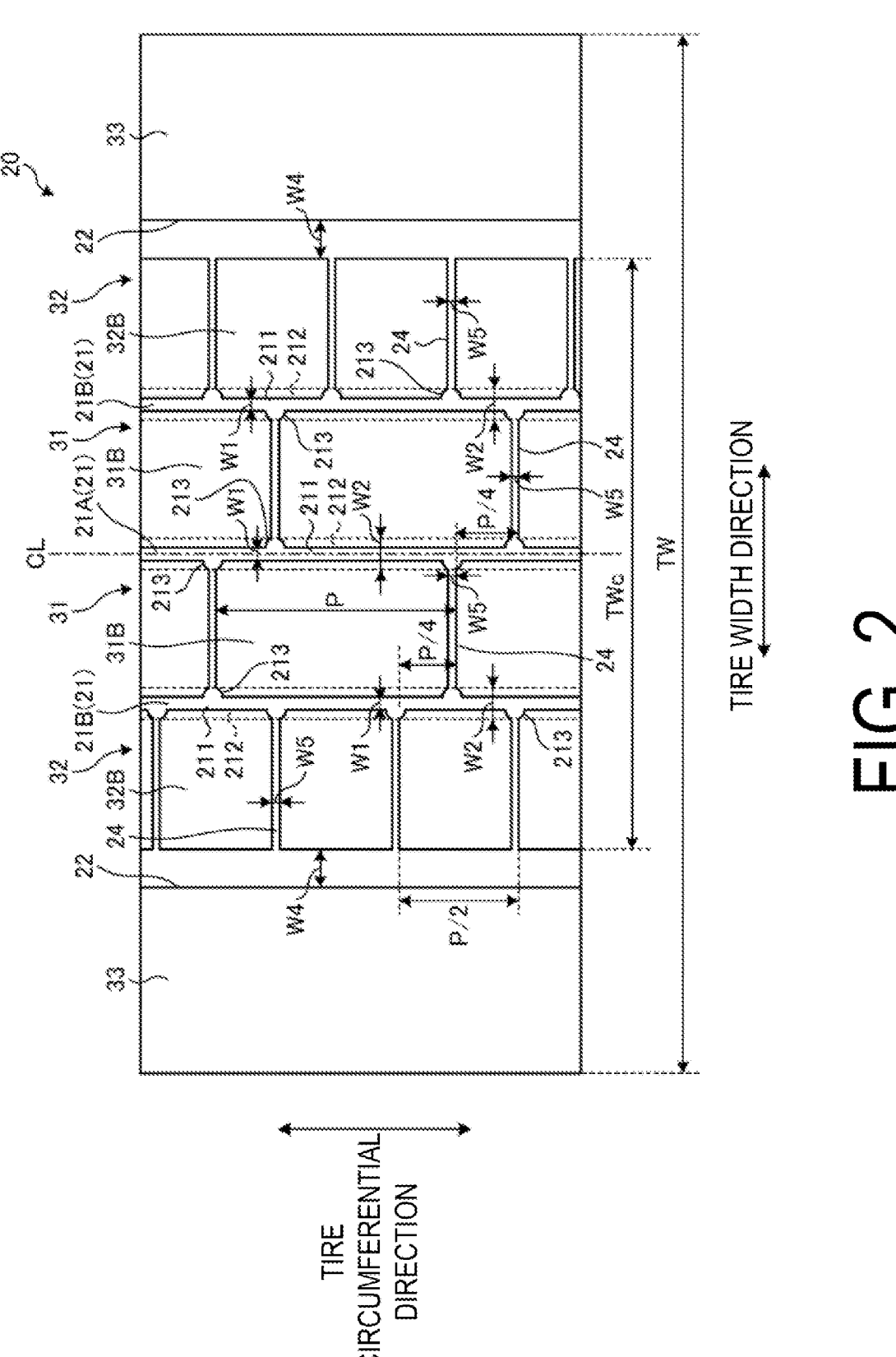
FIG. 2 is a developed view illustrating a tread pattern of a pneumatic tire.
Figure 3:
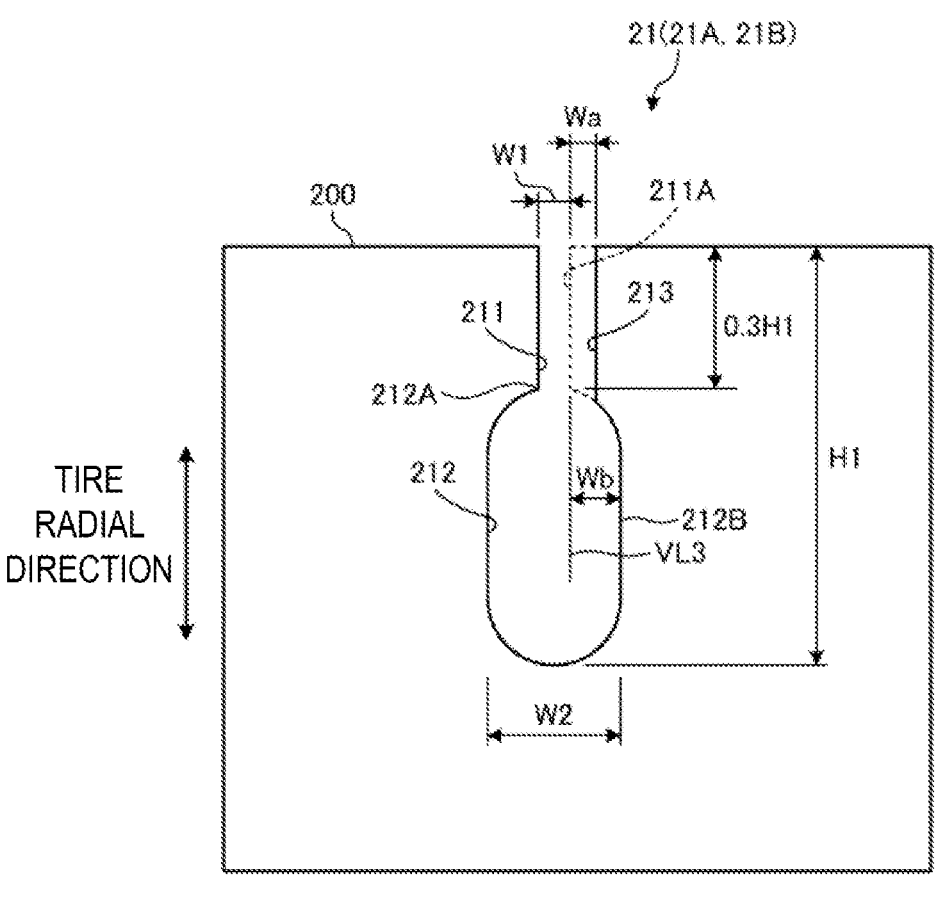
FIG. 3 is a schematic view illustrating a cross-sectional shape of a circumferential narrow main groove formed in a tread portion.
Figure 4:
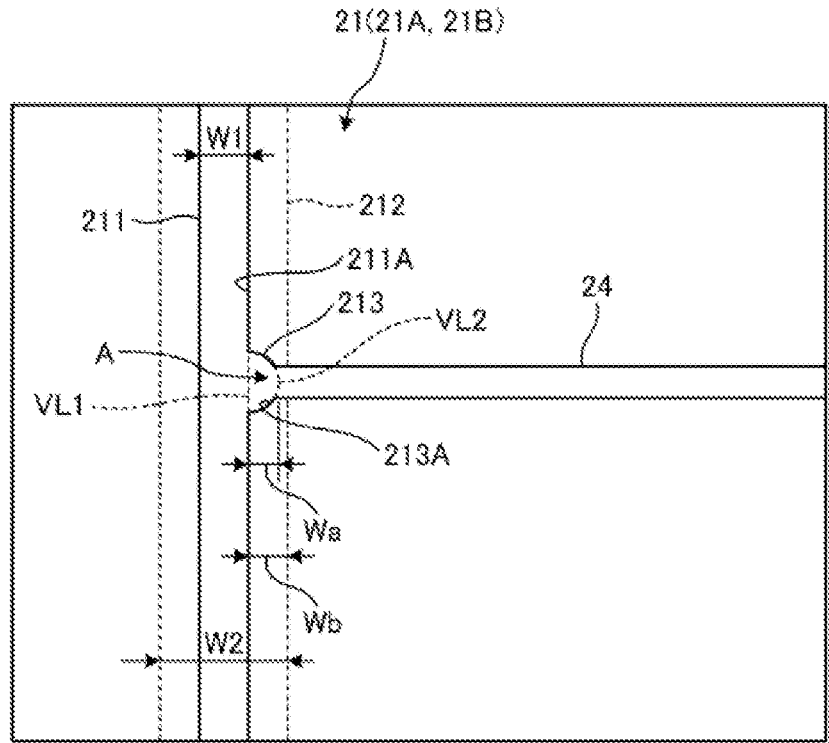
FIG. 4 is a partially enlarged view schematically illustrating a road contact surface of a tread portion illustrating a circumferential narrow main groove and a sipe.
Figure 5:
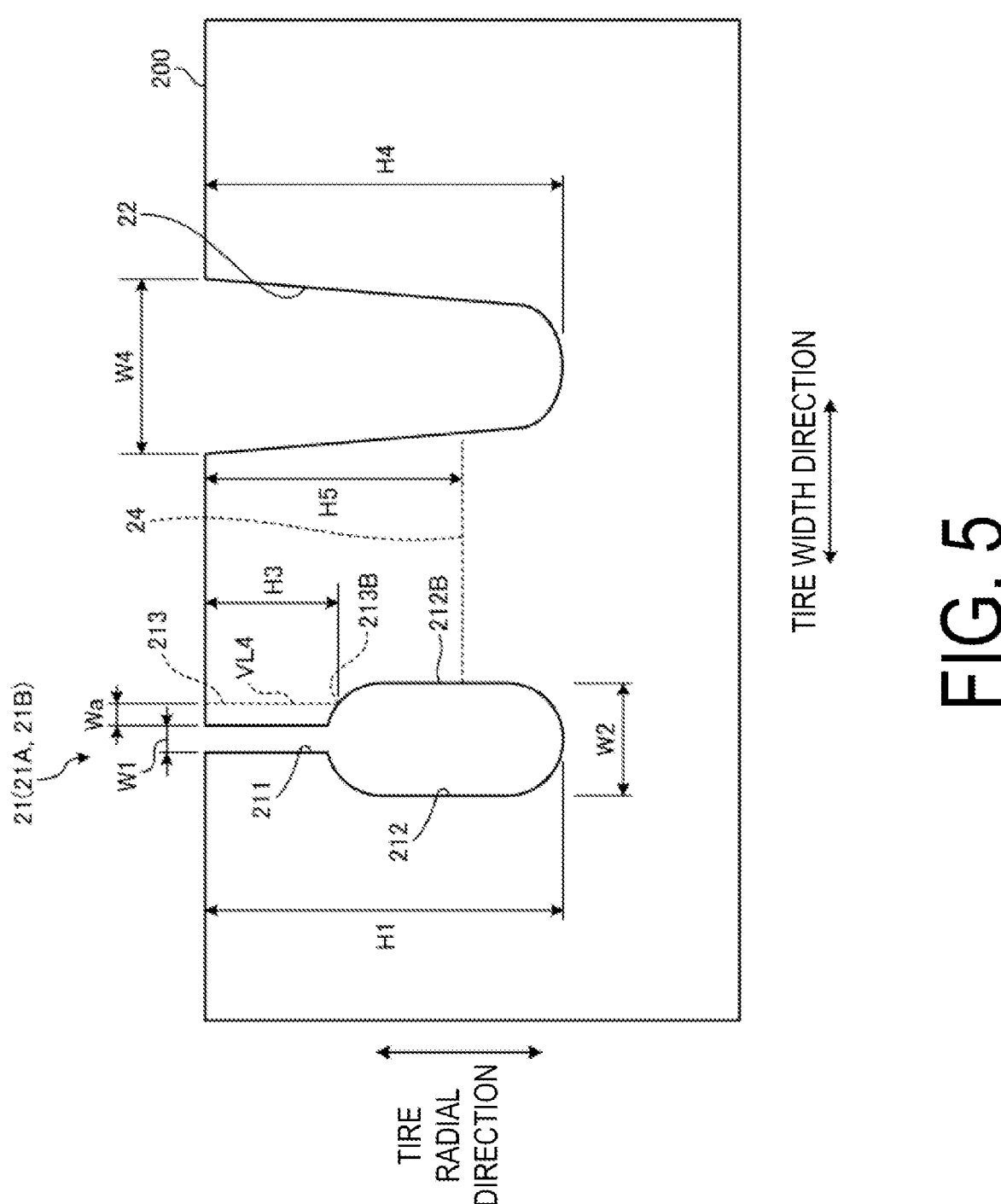
FIG. 5 is a schematic view illustrating a cross-sectional shape of a circumferential narrow main groove and a circumferential main groove formed in a tread portion.
Figure 6:
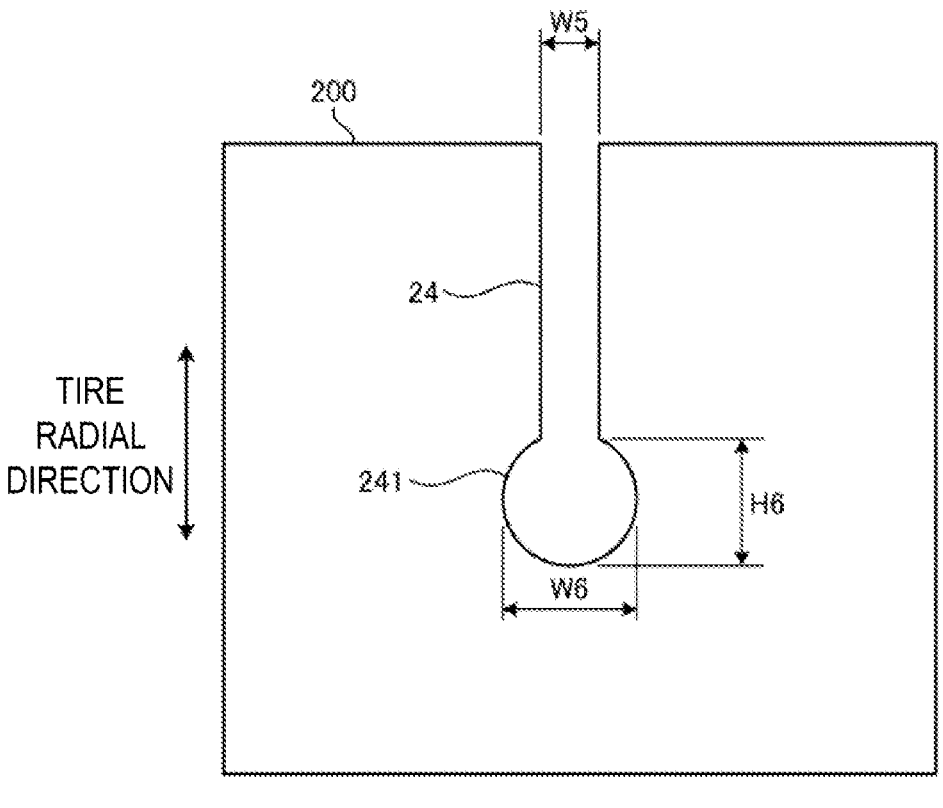
FIG. 6 is a schematic view illustrating the cross-sectional shape of the sipe formed in a tread portion.

FIG. 1 is a meridian cross-sectional view illustrating main parts of a pneumatic tire according to the present embodiment. FIG. 1 illustrates a cross-sectional view of a half region of a pneumatic tire 1 (hereinafter sometimes referred to simply as a tire 1) in a tire radial direction. FIG. 2 is a developed view illustrating a tread pattern of a pneumatic tire. FIG. 3 is a schematic view illustrating a cross-sectional shape of a circumferential narrow main groove formed in a tread portion. FIG. 4 is a partially enlarged view schematically illustrating a road contact surface of a tread portion illustrating a circumferential narrow main groove and a sipe. FIG. 5 is a schematic view illustrating a cross-sectional shape of a circumferential narrow main groove and a circumferential main groove formed in a tread portion. FIG. 6 is a schematic view illustrating the cross-sectional shape of the sipe formed in a tread portion. In the following description, the meridian cross-section refers to a cross-section when a tire is cut on a plane including a tire rotation axis (not illustrated). Further, a reference sign CL is a tire equatorial plane, and refers to a plane that passes through the center point of the tire in the tire rotation axis direction and is perpendicular to the tire rotation axis. Additionally, a tire width direction refers to a direction parallel with the tire rotation axis, an inner side in the tire width direction refers to a side toward the tire equatorial plane CL in the tire width direction, and an outer side in the tire width direction refers to a side away from the tire equatorial plane CL in the tire width direction. The tire radial direction refers to a direction perpendicular to the tire rotation axis, an inner side in the tire radial direction refers to a side toward the rotation axis in the tire radial direction, and an outer side in the tire radial direction refers to a side away from the rotation axis in the tire radial direction.

As illustrated in FIG. 1, the pneumatic tire 1 includes a pair of bead cores 11, 11, a carcass layer 13, a belt layer 14, a tread rubber 15 that constitutes a tread portion 20, sidewall rubbers 16, 16 that constitute left and right sidewall portions, and rim cushion rubbers 17, 17 that constitute left and right bead portions. The surface of the tread portion 20 forms a part of the contour of the pneumatic tire 1, and is formed as a road contact surface 200 that contacts the road surface when the vehicle travels. The belt layer 14 has a structure in which a plurality of belt plies are stacked. In FIG. 1, the belt layer 14 has a structure in which a large-angle belt 141, a pair of cross belt plies 142, 143, and a belt cover 144 are stacked. A bead filler may be provided on an outer side of the bead core 11 in the tire radial direction. Note that the tire internal structure described above represents a typical example for a pneumatic tire, but the pneumatic tire is not limited thereto.

As illustrated in FIG. 2, the road contact surface 200 of the tread portion 20 is provided with a first circumferential narrow main groove (circumferential narrow groove) 21A extending in a tire circumferential direction at a position of the tire equatorial plane CL, a pair of second circumferential narrow main grooves (circumferential narrow grooves) 21B extending in the tire circumferential direction at positions further on the outer side in the tire width direction than the first circumferential narrow main groove 21A on both sides of the tire equatorial plane CL, and a pair of circumferential main grooves 22 extending in the tire circumferential direction at positions further on the outer side in the tire width direction than the second circumferential narrow main groove 21B. It is preferable that the second circumferential narrow main groove 21B and the circumferential main groove 22 are disposed in a position of left-right symmetry with respect to the tire equatorial plane CL. Note that, in a case where the first circumferential narrow main groove 21A and the second circumferential narrow main groove 21B are not distinguished, they are simply referred to as the circumferential narrow main groove 21.

The first circumferential narrow main groove 21A, the second circumferential narrow main groove 21B, and the circumferential main groove 22 are five straight main grooves extending in the tire circumferential direction, and have a wear indicator defined by JATMA (The Japan Automobile Tyre Manufacturers Association, Inc.) in the groove bottom. The pair of circumferential main grooves 22 are shoulder main grooves located on the outermost side in the tire width direction and have a wider (larger) groove width than three of the circumferential narrow main grooves 21 disposed between the circumferential main grooves 22, 22. The groove width is the distance between opposing wall surfaces of the groove, and in a case where an opening portion of the groove is chamfered, the distance between the intersection points between the extension line of the road contact surface 200 and the extension lines of the wall surfaces of the groove is defined as the groove width. In the circumferential narrow main groove 21, a groove width W1 that opens to the road contact surface 200 when the tire is new is preferably greater than 1.0 mm and 4.0 mm or less, and more preferably 1.5 mm or more and 3.0 mm or less. Additionally, the circumferential main groove 22 is the groove having the greatest groove width in the circumferential grooves formed in the tread portion 20. A groove width W4 of the circumferential main groove 22 when the tire is new is preferably 8.0 mm or more and 15.0 mm or less, and more preferably 10 mm or more and 13 mm or less. In the present embodiment, three of the circumferential narrow main grooves 21 are provided between the pair of circumferential main grooves 22. However, it is sufficient that at least one circumferential narrow main groove 21B is provided, and particularly, a configuration is preferred in which two or more and four or less circumferential narrow main grooves 21 are provided.

The tread portion 20 is divided into a plurality of land portions by forming the first circumferential narrow main groove 21A, the second circumferential narrow main groove 21B, and the circumferential main groove 22. Specifically, in the tread portion 20, a first land portion 31 extending in the tire circumferential direction is formed between the first circumferential narrow main groove 21A and the second circumferential narrow main groove 21B. The first land portion 31 is divided into a plurality of first blocks 31B by a plurality of sipes (width-direction sipes) 24 that extend in the tire width direction and extend through the first land portion 31. In other words, the first land portion 31 includes the plurality of first blocks 31B divided by the sipes 24 and aligned in the tire circumferential direction, and is configured as a block row by the plurality of first blocks 31B. The first block 31B is disposed repeatedly at a predetermined pitch P in the tire circumferential direction. This pitch P refers to the distance when the first block 31B is repeatedly disposed in the tire circumferential direction, and is the sum of the distance of the first block 31B and the groove width of the sipe 24 in the tire circumferential direction.

Additionally, in the tread portion 20, a second land portion 32 extending in the tire circumferential direction is formed between the second circumferential narrow main groove 21B and the circumferential main groove 22. The second land portion 32 is divided into a plurality of second blocks 32B by the sipes 24 extending in the tire width direction. In other words, similarly to the first land portion 31, the second land portion 32 includes the plurality of second blocks 32B divided by the sipes 24 and aligned in the tire circumferential direction and is configured as a block row by the plurality of second blocks 32B. The second block 32B is disposed repeatedly at a pitch (a half pitch (P/2) corresponding to half the pitch P in FIG. 2) set shorter than the first block 31B described above.

The sipe 24 is open to the adjacent first circumferential narrow main groove 21A and second circumferential narrow main groove 21B; or the adjacent second circumferential narrow main groove 21B and circumferential main groove 22 and connects (links) those to each other, and the sipe 24 has a groove width narrower than that of the circumferential narrow main groove 21. Specifically, in the sipe 24, a groove width W5 that is open to the road contact surface 200 when the tire is new is preferably 1.0 mm or less.

Additionally, in the tread portion 20, a shoulder land portion 33 extending in the tire circumferential direction is formed on an outer side of the circumferential main groove 22 in the tire width direction. The shoulder land portion 33 is located in the shoulder portion of the tread portion 20. The shoulder land portion 33 may include a plurality of shoulder lug grooves (not illustrated) having one end connected to the circumferential main grooves 22 and extending in the tire width direction and may be divided into a plurality of shoulder blocks by the shoulder lug grooves.

In the example of FIG. 2, all of the sipes 24 of the tread portion 20 include the plurality of rectangular first blocks 31B and second blocks 32B extending in the tire width direction, and the plurality of first blocks 31B and the second block 32B are disposed in a staggered manner to form a block pattern. Specifically, the first blocks 31B, 31B adjacent to each other with the first circumferential narrow main groove 21A interposed therebetween are disposed to be displaced (shifted) by a 1/4 pitch (P/4) in the tire circumferential direction, and the first block 31B and second block 32B adjacent to each other with the second circumferential narrow main groove 21B interposed therebetween are also disposed to be shifted by a 1/4 pitch (P/4) in the tire circumferential direction. Note that the block pattern of the tread portion 20 is not limited to that illustrated in FIG. 2, and the lengths in the tire circumferential direction of the first block 31B and the second block 32B, the displacement amount of each block, and the like can be appropriately changed. Additionally, the extension direction of the sipes 24 is not limited to the tire width direction as long as the sipes 24 intersect the circumferential narrow main groove 21, and all of the sipes 24 may be inclined with respect to the tire width direction. For example, the first land portion 31 and the second land portion 32 on both sides with the tire equatorial plane CL interposed therebetween may be inclined with respect to the tire width direction so that the inclination direction of the sipes 24 is V-shaped.

In this configuration, the tread portion 20 defines the first land portion 31 and the second land portion 32 by the first circumferential narrow main groove 21A and the second circumferential narrow main groove 21B having the groove width W1 narrower than the groove width W4 of the circumferential main groove 22. As a result, when the tire 1 contacts the ground, the first circumferential narrow main groove 21A and the second circumferential narrow main groove 21B are closed, and the adjacent first blocks 31B or the adjacent first and second blocks 31B and 32B act as a wide block, whereby rolling resistance can be reduced. Furthermore, for the adjacent first land portions 31 or the adjacent first and second land portions 31 and 32, the first block 31B and the second block 32B are disposed so as to be shifted respectively in the tire circumferential direction. As a result, the sipes 24 are prevented from communicating with each other, and noise when the tire 1 contacts the ground can be reduced. Additionally, since the sipes 24 have the smaller groove width W5 than the groove width W1 of the circumferential narrow main groove 21, the traction performance can be improved while reducing the rolling resistance. Additionally, since the circumferential main groove 22 is a main groove located on the outermost side in the tire width direction, it has less influence on rolling resistance than the circumferential narrow main groove 21 disposed on the center side. In this configuration, the groove width W4 of the circumferential main groove 22 is prefer-ably 3.0% or more and 5.0% or less of a ground contact width TW of the tread portion 20, and more preferably 3.5% or more and 4.5% or less. By configuring the groove width W4 of the circumferential main groove 22 to be 3.0% or more and 5.0% or less of the ground contact width TW of the tread portion 20, wet traction performance can be improved without deteriorating the rolling resistance.

In the tread portion 20, a ratio (TWc/TW) of a width (length) TWc in the tire width direction of the land portion defined by the pair of circumferential main grooves 22, 22 to the ground contact width TW of the tread portion 20 is preferably in the range of from 0.50 or more to 0.60 or less. As a result, since a tread pattern in which block rows are concentrated in the center portion of the tread portion 20 can be formed, the rigidity of the tread portion 20 can be increased, and the effect of reducing the rolling resistance can be improved.

Here, the width TWc is the length in the tire width direction between the pair of circumferential main grooves 22, 22, and is the sum of the width of the four block rows (the first land portion 31 and the second land portion 32) and the groove width W1 of three of the circumferential narrow main grooves 21. In other words, the width TWc refers to the linear distance in the tire width direction between the pair of circumferential main grooves 22, 22 of the tread portion 20 of the tire 1 in a developed view, measured when the tire 1 is mounted on a specified rim and inflated to a specified internal pressure and no load is applied. The ground contact width TW of the tread portion 20 is the distance in the tire width direction between both ends on an outer side of two of the shoulder land portions 33 in the tire width direction. In the present embodiment, the ground contact width TW is the length equivalent to the tread development width, and the tread development width refers to the linear distance between both ends of the tread portion 20 of the tire 1 in a developed view, measured when the tire 1 is mounted on a specified rim and inflated to a specified internal pressure and no load is applied. Additionally, the specified rim refers to an "applicable rim" defined by JATMA, a "Design Rim" defined by TRA (The Tire and Rim Association, Inc.), or a "Measuring Rim" defined by ETRTO (European Tire and Rim Technical Organization). Additionally, "specified inter-nal pressure" refers to a "maximum air pressure" defined by JATMA, to the maximum value in "TIRE LOAD LIMITS AT VARIOUS COLD INFLATION PRESSURES" defined by TRA, or to "INFLATION PRESSURES" defined by ETRTO. Additionally, "specified load" refers to a "maxi-mum load capacity" defined by JATMA, the maximum value in "TIRE LOAD LIMITS AT VARIOUS COLD INFLATION PRESSURES" defined by TRA, or "LOAD CAPACITY" defined by ETRTO.

In this configuration, in order to reduce the rolling resis-tance of the tire 1 as described above, the tread portion 20 has a configuration in which the first land portion 31 and the second land portion 32 defined by the first circumferential narrow main groove 21A and the second circumferential narrow main groove 21B having the groove width W1 narrower than the groove width W4 of the circumferential main groove 22 are concentrated in the center portion. On the other hand, in the configuration described above, since the groove volume of the circumferential narrow main groove 21 is reduced and the drainage properties are dete-riorated, there is a concern that the wet traction performance inherent in the block pattern is deteriorated. Therefore, as illustrated in FIG. 3, the circumferential narrow main groove 21 has a stepped groove shape including a narrow groove portion (opening portion) 211 and a widened portion 212 disposed further on the groove bottom side (an inner side in the tire radial direction) than the narrow groove portion 211 and having a groove width wider than the narrow groove portion 211. In the present embodiment, all the three cir-cumferential narrow main grooves 21 are provided with the widened portion 212, but at least one circumferential narrow main groove 21 may be provided with the widened portion 212. In this case, it is preferable that one circumferential narrow main groove 21 provided with the widened portion 212 is provided at the position of the tire equatorial plane CL (the center in the tire width direction) or in the vicinity of the position of the tire equatorial plane CL.

The narrow groove portion 211 of the circumferential narrow main groove 21 is a portion that is open to the road contact surface 200 of the tread portion 20 and is in a region that is less than 30% (0.3 H1) of a maximum groove depth H1 from the road contact surface 200. This maximum groove depth H1 refers to a groove depth of the circumfer-ential narrow main groove 21 when the tire is new. The groove width W1 of the narrow groove portion 211 is preferably greater than 1.0 mm and 4.0 mm or less. If the groove width W1 is 1.0 mm or less, the drainage properties are deteriorated, and the wet traction performance deterio-rates. On the other hand, if the groove width W1 is greater than 4.0 mm, the rigidity of the adjacent block rows with the circumferential narrow main groove 21 interposed therebe-tween decreases, and the rolling resistance is deteriorated. In this configuration, by setting the groove width W1 of the narrow groove portion 211 to be greater than 1.0 mm and 4.0 mm or less, the circumferential narrow main grooves 21 are closed when the tire 1 contacts the ground and the groove walls support each other. As a result, the block rigidity is improved, the energy loss in the groove bottom portion is reduced, and the rolling resistance can be reduced. The groove width W1 of the narrow groove portion 211 is preferably 1.5 mm or more and 3.0 mm or less.

The widened portion 212 is a portion that includes a widening starting point (widening starting position) 212A connected to the narrow groove portion 211 on an outer side in the tire radial direction and is in a region that is at least 30% of the maximum groove depth H1 from the road contact surface 200 of the tread portion 20. The widened portion 212 has a maximum groove width W2 that is wider than the groove width W1 of the narrow groove portion 211. The widening starting point 212A refers to a height position at which the groove width is widened to be equal to or more than a predetermined value (for example, the smaller one of: 1.2 times the groove width W1 of the narrow groove portion 211 and the groove width W1+0.5 mm). In this configura-tion, since the circumferential narrow main groove 21 is provided with the widened portion 212 that is wider than the narrow groove portion 211 in a region of 30% or more of the maximum groove depth H1 from the road contact surface 200 of the tread portion 20, the drainage properties are improved due to the water entering the widened portion 212, and the wet traction performance can be improved.

Specifically, the maximum groove width W2 of the widened portion 212 is preferably 3.0 mm or more and 8.0 mm or less, and a ratio (W2/W1) of the maximum groove width W2 of the widened portion 212 to the groove width W1 of the narrow groove portion 211 is preferably in the range of 1.0<(W2/W1)≤4.0. If the ratio (W2/W1) is 1.0 or less, the wet traction performance deteriorates. On the other hand, if the ratio (W2/W1) is greater than 4.0, since the rigidity of the block rows adjacent to each other with the circumferential narrow main groove 21 interposed therebetween is reduced, the rolling resistance is deteriorated. Additionally, if the ratio (W2/W1) is greater than 4.0, since the degree of widening of the widest groove width W2 of the widened portion 212 with respect to the groove width W1 of the narrow groove portion 211 is excessively large, processing of the circumferential narrow main groove 21 is difficult and productivity is deteriorated. By configuring the ratio (W2/W1) of the groove width W1 of the narrow groove portion 211 to the maximum groove width W2 of the widened portion 212 to be in the range of 1.0<(W2/W1)≤4.0, it is possible to reduce the rolling resistance and improve the wet traction performance in a compatible manner. Furthermore, the ratio (W2/W1) is more preferably 1.5≤(W2/W1)≤3.0.

In the tire 1 described above, the circumferential narrow main groove 21 provided with the widened portion 212 includes a plurality of notch portions 213 that bulge on one side in the tire width direction at intervals in the tire circumferential direction, and the sipes 24 are each connected (communicating) to the notch portions 213. The notch portions 213 are voids corresponding to reinforcing portions that reinforce the connection portions between the circumferential narrow main grooves and the sipes in a mold (not illustrated) for molding the tire 1. Therefore, in this configuration, the notch portion 213 is formed so as to bulge toward the side connected to the sipe 24. Note that in the example of FIG. 2, the sipes 24 are respectively connected to all of the notch portions 213. However, it is sufficient that the sipe 24 is connected to at least one notch portion 213 in the circumferential narrow main groove 21, and among the plurality of notch portions 213, there may be a notch portion 213 that is not connected to the sipe 24.

As illustrated in FIG. 3, the notch portion 213 extends in the tire radial direction from the road contact surface 200 of the tread portion 20 to the widened portion 212 to communicate with the widened portion 212. As a result, since the groove width (opening area) of the narrow groove portion 211 of the circumferential narrow main groove 21 is increased by the amount of the notch portion 213, the drainage properties of the circumferential narrow main groove 21 are improved, and the wet traction performance is improved. On the other hand, by providing the notch portion 213, since the rigidity of block rows adjacent to each other with the circumferential narrow main groove 21 interposed therebetween is reduced by the amount of the notch portion 213, there is a concern that the rolling resistance may be deteriorated.

Therefore, in this configuration, as illustrated in FIG. 2, the notch portion 213 is formed so as to bulge in a substantially semicircular shape on one side in the circumferential narrow main groove 21 in the tire width direction, that is, on only the side connected to each of the sipes 24. Therefore, as compared with a configuration in which the notch portion bulges on both sides in the tire width direction with the circumferential narrow main groove interposed therebetween, when a flat groove wall of the circumferential narrow main groove 21 on the side where the notch portion 213 does not bulge is formed flat, the flat groove wall supports the bulging groove wall due to the notch portion 213. As a result, reduction in block rigidity can be suppressed and the rolling resistance can be reduced.

Additionally, in this configuration, the opening area of the notch portion 213 in the road contact surface 200 of the tread portion 20 is preferably 1.5 mm$^2$ or more and 10.0 mm$^2$ or less. The opening area can be calculated as the area of a region A surrounded by: a virtual line VL1 extended from the groove wall 211A of the narrow groove portion 211 provided with the notch portion 213, a contour line 213A of the notch portion 213, and a virtual line VL2 extended from the contour line 213A as illustrated in FIG. 4, with the tire 1 mounted on the specified rim described above and inflated with 100 kPa. If the opening area is less than 1.5 mm$^2$, the wet traction performance cannot be sufficiently improved. Additionally, if the opening area is greater than 10.0 mm$^2$, the rigidity of the block row decreases, and the rolling resistance is deteriorated. With this configuration, by setting the opening area of the notch portion 213 in the road contact surface 200 of the tread portion 20 to be 1.5 mm$^2$ or more and 10.0 mm$^2$ or less, it is possible to improve the wet traction performance and suppress deterioration of the rolling resistance in a compatible manner. Furthermore, the opening area of the notch portion 213 is more preferably 1.5 mm$^2$ or more and 8.0 mm$^2$ or less.

Additionally, a ratio (Wa/W1) of a width Wa of the notch portion 213 to the groove width W1 of the narrow groove portion 211 is preferably in the range of 0.5≤(Wa/W1)≤2.0. The width Wa of the notch portion 213 can be calculated as the maximum distance between the virtual line VL1 and the virtual line VL2 illustrated in FIG. 4 under the conditions for determining the opening area described above. If the ratio (Wa/W1) is less than 0.5, the width Wa of the notch portion 213 with respect to the groove width W1 of the narrow groove portion 211 is small, and it is not possible to sufficiently improve the wet traction performance. Additionally, if the ratio (Wa/W1) is greater than 2.0, the rigidity of the block row decreases, and the rolling resistance is deteriorated. In this configuration, the ratio (Wa/W1) of the width Wa of the notch portion 213 to the groove width W1 of the narrow groove portion 211 is in the range of 0.5≤(Wa/W1)≤2.0, it is possible to improve the wet traction performance and suppress deterioration of the rolling resistance in a compatible manner.

Additionally, as described above, the ratio (W2/W1) of the maximum groove width W2 of the widened portion 212 to the groove width W1 of the narrow groove portion 211 is in the range of 1.0<(W2/W1)≤4.0. However, in addition to this, a ratio (Wa/Wb) of the width Wa of the notch portion 213 to a width Wb from the narrow groove portion 211 to the widened portion 212 is preferably in the range of 0.5≤(Wa/Wb)≤2.0. Here, the width Wb is the maximum distance between the narrow groove portion 211 and the widened portion 212 in the tire width direction, and can be calculated as the maximum distance in the tire width direction between a virtual line VL3 extended from the groove wall 211A of the narrow groove portion 211 in the tire radial direction and a contour line 212B of the widened portion 212 in the conditions for determining the opening area described above. If the ratio (Wa/Wb) is less than 0.5, the width Wa of the notch portion 213 with respect to the width Wb is small, and it is not possible to sufficiently drain water to the widened portion 212 through the notch portion 213, and it is not possible to sufficiently improve the wet traction performance. Additionally, if the ratio (Wa/Wb) is greater than 2.0, the rigidity of the block row decreases, and the rolling resistance is deteriorated. In this configuration, the ratio (W2/W1) of the maximum groove width W2 of the widened portion 212 to the groove width W1 of the narrow groove portion 211 is in the range of 1.0<(W2/W1)≤4.0, and the ratio (Wa/Wb) of the width Wa of the notch portion 213 to the width Wb from the narrow groove portion 211 to the widened portion 212 is in the range of 0.5≤(Wa/Wb)≤2.0. Therefore, appropriate dimensional conditions of the circumferential narrow main groove 21 can be defined, and it is possible improve the wet traction performance and suppress deterioration of the rolling resistance in a compatible manner.

In the tire 1 described above, the maximum groove depth H1 of the circumferential narrow main groove 21 is formed to be equivalent to a groove depth H4 of the circumferential main groove 22, as illustrated in FIG. 5. Specifically, a ratio (H1/H4) of the maximum groove depth H1 to the groove depth H4 is in the range of 0.95≤(H1/H4)≤1.05. Therefore, the circumferential narrow main groove 21 ensures the drainage properties together with the circumferential main groove 22 at the end of wear, whereby the wet traction performance can be improved. Additionally, a groove depth H5 of the sipe 24 described above preferably satisfies the relationship of H3<H5<0.9 H1 with respect to: a depth H3 from the road contact surface 200 of the tread portion 20 to a connection portion 213B between the notch portion 213 and the widened portion 212; and the maximum groove depth H1 of the circumferential narrow main groove 21.

The connection portion 213B is located on the innermost side in the tire radial direction at the connection portion between the notch portion 213 and the widened portion 212, and is an intersection point between a virtual line VL4 extended in the tire radial direction from the measurement point of the width Wa of the notch portion 213 and the contour line 212B of the widened portion 212. Since the groove depth H5 of the sipe 24 is greater than the depth H3 from the road contact surface 200 of the tread portion 20 to the connection portion 213B of the notch portion 213, the sipe 24 can be directly connected to the widened portion 212 of the circumferential narrow main groove 21, the drainage properties can be further improved, and the wet traction performance can be improved.

Furthermore, as illustrated in FIG. 6, the sipe 24 preferably includes a widened sipe (widened portion) 241 having a widened groove width at the bottom portion. By providing the widened sipe 241 at the bottom portion of the sipe 24, the drainage properties of the sipe 24 can be improved, and the wet traction performance can be improved. Additionally, the widened sipe 241 preferably has a maximum width W6 and a height H6 from the groove bottom, and the maximum width W6 and the height H6 are preferably 1.2 times or more and 3.0 times or less the groove width W5 of the sipes 24. In this case, if the values are less than 1.2 times, the wet traction performance cannot be sufficiently improved. Additionally, if the values are greater than 3.0 times, the widened sipe 241 will be relatively large, the rigidity of block rows adjacent in the tire circumferential direction decreases, and the rolling resistance is deteriorated.

In the tire 1 described above, the number of the notch portions 213 provided in one circumferential narrow main groove 21 is preferably 10 or more and 20 or less in the ground contact surface of the tread portion 20. Note that the ground contact surface refers to a region in which the tire 1 contacts a flat plate when the tire 1 is mounted on a specified rim, inflated with a specified internal pressure, placed perpendicularly to the flat plate in a stationary state, and applied with a load corresponding to a specified load. If the number of the notch portions 213 in the ground contact surface is less than 10, it is not possible to sufficiently drain water to the widened portion 212 through the notch portion 213 and the wet traction performance cannot be sufficiently improved. If the number of the notch portions 213 in the ground contact surface is greater than 20, the rigidity of the block row decreases and the rolling resistance is deteriorated. In this configuration, by setting the number of the notch portions 213 in the ground contact surface to be 10 or more and 20 or less, it is possible to define a numerical range in which the wet traction performance can be improved in a range where the rolling resistance does not deteriorate. Furthermore, the number of the notch portions 213 in the ground contact surface is more preferably 12 or more and 15 or less.

In the tire 1 described above, among the plurality of notch portions 213 provided in one circumferential narrow main groove 21, a ratio (Nin/Nout) of the number Nin of notch portions 213 bulging on the inner side in the tire width direction with respect to the number Nout of notch portions 213 bulging on the outer side in the tire width direction of the circumferential narrow main groove 21 is preferably 0.2≤(Nin/Nout)≤1.0. In this definition, more notch portions 213 are formed on the shoulder side than the tire equatorial plane CL side. In addition, in the example of FIG. 2, since the first circumferential narrow main groove 21A is provided at the position of the tire equatorial plane CL, for the notch portions 213 provided in the first circumferential narrow main groove 21A, in a case where either one side in the tire width direction is defined as the outer side, the other side is defined as the inner side, and the ratio (Nin/Nout) is set to 1.0.

If the ratio (Nin/Nout) is less than 0.2, the notch portions 213 are concentrated on the outer side in the tire width direction, whereby the block rigidity on the outer side in the tire width direction decreases and the rolling resistance is deteriorated. Additionally, if the ratio (Nin/Nout) is greater than 1.0, the number of the notch portions 213 on the tire equatorial plane CL side will be greater than that on the shoulder side, and the drainage properties may be deteriorated. In this configuration, by setting the ratio (Nin/Nout) to be in the range of 0.2≤(Nin/Nout)≤1.0, deterioration of the rolling resistance can be suppressed while maintaining the drainage properties. The ratio (Nin/Nout) is more preferably 0.2≤(Nin/Nout)≤1.0.

Additionally, in the tire 1 described above, a ratio (N2/N1) of the number N2 of the second blocks 32B dividing the second land portion 32 by the sipes 24 and being aligned in the tire circumferential direction to the number N1 of the first blocks 31B dividing the first land portion 31 by the sipes 24 and being aligned in the tire circumferential direction is preferably in the range of 1.2≤(N2/N1)≤2.0. In other words, the number N2 of the second blocks 32B positioned on the outer side in the tire width direction is preferably greater than the number N1 of the first block 31B in the range described above. If the ratio (N2/N1) is less than 1.2, since the drainage from the first land portion 31 to the second land portion 32 through the sipes 24 is suppressed, the wet traction performance is deteriorated. Additionally, if the ratio (N2/N1) is greater than 2.0, since the block rigidity of the second land portion 32 is reduced, the rolling resistance is deteriorated. In this configuration, by setting the ratio (N2/N1) to be in the range of 1.2≤(N2/N1)≤2.0, the block rigidity of the first land portion 31 and the second land portion 32 having a high ground contact pressure can be ensured, and the number of the sipes 24 connected to the circumferential main grooves 22 having higher drainage properties can be ensured. Therefore, it is possible improve the wet traction performance and reduce the rolling resistance in a compatible manner.

Figure 7:
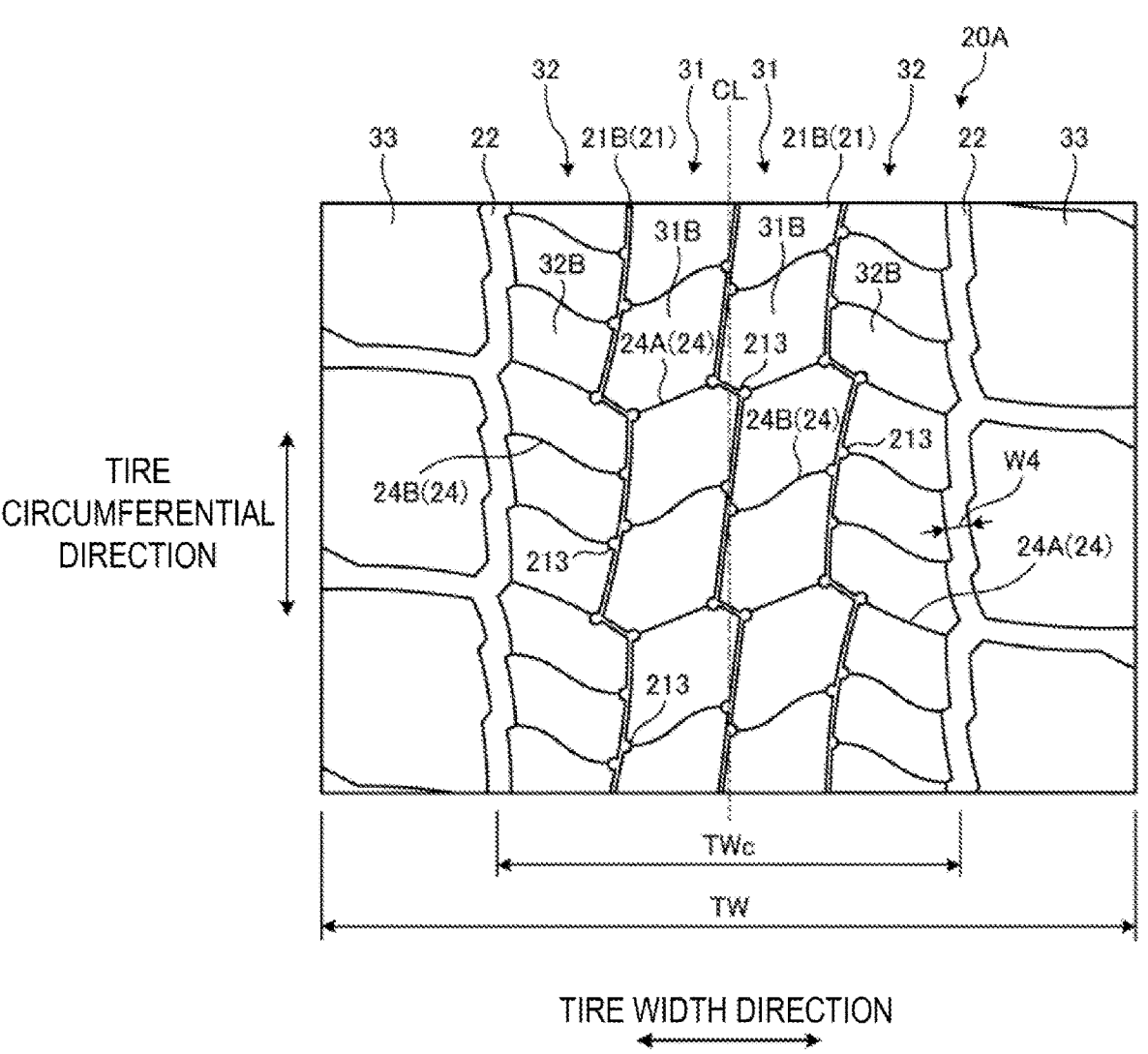
FIG. 7 is a developed view illustrating a tread pattern of the pneumatic tire according to another embodiment.
Figure 8:
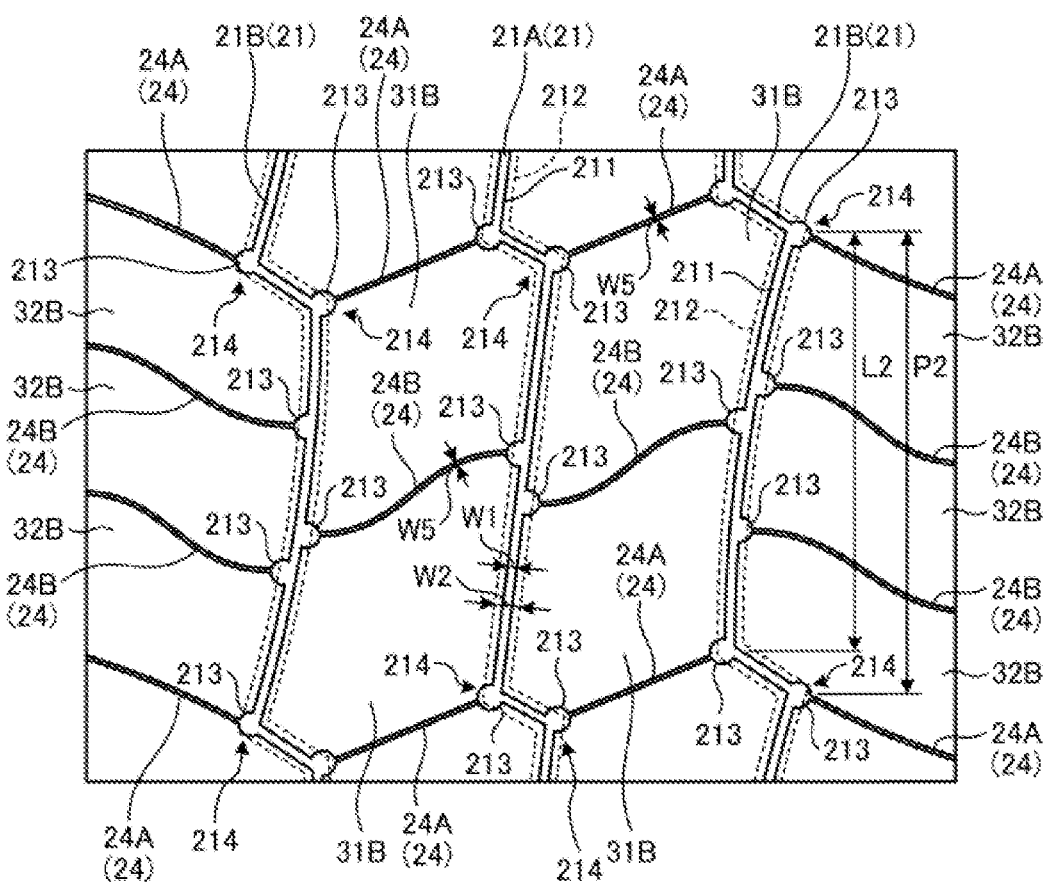
FIG. 8 is an enlarged view of the tread portion illustrated in FIG. 7.

Next, another embodiment will be described. FIG. 7 is a developed view illustrating a tread pattern of a pneumatic tire according to another embodiment. FIG. 8 is an enlarged view of the tread portion illustrated in FIG. 7. In the embodiment described above, the circumferential narrow main grooves 21 and the circumferential main grooves 22 provided in the tread portion 20 have a straight shape. In contrast, in this embodiment, the configuration is significantly different in that the circumferential narrow main groove 21 and the circumferential main groove 22 have a zigzag shape that the grooves are repeatedly and alternately bent in the tire width direction while extending in the tire circumferential direction. In the present embodiment, a configuration different from that of the above-described embodiment will be described, and the description of a configuration identical to that of the above-described embodiment such as the circumferential narrow main groove 21 being a stepped groove provided with the narrow groove portion 211 and the widened portion 212 will be omitted.

As illustrated in FIG. 7, the circumferential narrow main groove 21 and the circumferential main groove 22 each have a long portion and a short portion (reference sign is omitted in the drawing), and have a zigzag shape formed by alternately connecting the long portion and the short portion. In the example of FIG. 7, the long portions of the circumferential main grooves 22 are inclined in an identical direction (downward to the right in the drawing). Additionally, the long portions of the first circumferential narrow main groove 21A and the second circumferential narrow main groove 21B are inclined in the opposite directions (downward to the left in the drawing) in the tire circumferential direction with respect to the long portion of the circumferential main groove 22. According to this configuration, the circumferential narrow main grooves 21 and the circumferential main grooves 22, disposed in the center region of the tread portion where the ground contact pressure is high, are formed in a zigzag shape, the edge components of the circumferential narrow main groove 21 and the circumferential main groove 22 increase, and the traction performance is improved.

As illustrated in FIG. 7, a tread portion 20A includes the first land portion 31 defined by the adjacent first circumferential narrow main groove 21A and second circumferential narrow main groove 21B, and the second land portion 32 defined by the adjacent second circumferential narrow main groove 21B and circumferential main groove 22. The first land portion 31 and the second land portion 32 are divided into the plurality of first blocks 31B and second blocks 32B, respectively, by the plurality of sipes 24 extending in the tire width direction.

In the present embodiment, the tread portion 20A has a configuration in which the first land portion 31 and the second land portion 32 are defined by the first circumferential narrow main groove 21A and the second circumferential narrow main groove 21B having the groove width W1 narrower than the groove width W4 of the circumferential main groove 22, forming a tread pattern in which block rows are concentrated in the center portion of the tread portion 20A.

Here, the long portion of the first circumferential narrow main groove 21A on the tire equatorial plane CL has a linear shape. As a result, the wet traction performance of the tire is improved. Additionally, the long portion of the second circumferential narrow main groove 21B has an arc shape that projects toward the tire equatorial plane CL side. As a result, deformation of the first block 31B when the tire is rolling is suppressed, and the rolling resistance of the tire 1 can be reduced.

As illustrated in FIG. 8, the first circumferential narrow main groove 21A and the second circumferential narrow main groove 21B are formed such that a pitch length P2 of the zigzag shape and a circumferential length L2 of the long portion are substantially identical. A ratio (L2/P2) of the circumferential length L2 of the long portion and the pitch length P2 of the zigzag shape is in the range of $0.85 \leq L2/P2 \leq 1.00$, and preferably in the range of $0.90 \leq L2/P2 \leq 0.96$. As a result, the zigzag shape of the first circumferential narrow main groove 21A and the second circumferential narrow main groove 21B is properly set. In particular, due to the lower limit of the specified range, the collapse of the blocks is effectively suppressed, the edge components are increased, and the rolling resistance of the tire 1 is reduced.

An intersection point 214 of the long portion and the short portion of the first circumferential narrow main groove 21A and the second circumferential narrow main groove 21B is the maximum amplitude position of the zigzag shape in the first circumferential narrow main groove 21A and the second circumferential narrow main groove 21B. In this configuration, the intersection point 214 that projects toward the outer side (the shoulder side) in the tire width direction of the first circumferential narrow main groove 21A and the intersection point 214 that projects toward the inner side (the tire equatorial plane CL side) in the tire width direction of the second circumferential narrow main groove 21B are connected by first sipes 24A. These first sipes 24A have a straight shape or a gentle arc shape. As described above, since the intersection points 214 of the zigzag-shaped first circumferential narrow main groove 21A and second circumferential narrow main groove 21B are connected, the drainage properties are improved. Additionally, the intersection point 214 that projects toward the outer side in the tire width direction of the second circumferential narrow main groove 21B and the circumferential main groove 22 are connected by the first sipe 24A. In this case, the first sipe 24A has a straight or gentle arc shape and extends along an extension line of the center line of the short portions of the second circumferential narrow main groove 21B and is connected to the circumferential main groove 22.

Further, the first circumferential narrow main groove 21A and the adjacent second circumferential narrow main grooves 21B are connected by one second sipe 24B. The second sipe 24B has a gentle S-shape, and connects the intermediate portions in the tire circumferential direction of each of the long portions of the first circumferential narrow main groove 21A and the second circumferential narrow main groove 21B. As a result, the drainage properties of the first land portion 31 (ground contact region) defined by the long portions of the zigzag shape are improved. Here, the connection positions of the second sipes 24B to the long portion of the first circumferential narrow main groove 21A are different (displaced) in the tire circumferential direction. As a result, the second sipes 24B connected to the long portions of the first circumferential narrow main groove 21A are prevented from being directly connected to each other. Additionally, the second circumferential narrow main groove 21B and the circumferential main groove 22 are connected by at least one second sipe 24B (two in the example of FIG. 8). In this case, the two second sipes 24B extending toward the outer side in the tire width direction from the second circumferential narrow main groove 21B are connected at a position sandwiching the second sipe 24B connected to the first circumferential narrow main groove 21A. As a result, the drainage properties from the tire equatorial plane CL side toward the outer side in the tire width direction can be improved.

In the tread portion 20A having the configuration described above, the first circumferential narrow main groove 21A and the second circumferential narrow main groove 21B each are provided with the plurality of notch portions 213 formed in the long portion at intervals in the tire circumferential direction, and the sipes 24 (the first sipe 24A and the second sipe 24B) are connected to the notch portions 213. Specifically, the notch portion 213 is provided on both ends of the long portion, that is, on the convex side of the intersection point 214 of the long portion and the short portion, and the first sipe 24A is connected to the notch portion 213. Here, the convex side of the intersection point 214 of the long portion and the short portion refers to a side having the larger angle among the two angles formed by the long portion and the short portion.

In addition, one long portion located between the intersection points 214 is provided with one or more notch portions 213 each independently bulging toward the outer side and the inner side in the tire width direction, and the second sipe 24B having a gentle S-shape is connected to each of the notch portions 213. In the example of FIG. 8, the long portion of the second circumferential narrow main groove 21B is provided with two notch portions 213 on the outer side in the tire width direction of the long portion and one notch portion 213 on the inner side in the tire width direction. Here, "independently bulging" means that the notch portions 213 exist individually without overlapping in the tire circumferential direction. Additionally, in the example of FIG. 8, since the first circumferential narrow main groove 21A is provided at the position of the tire equatorial plane CL, for the notch portions 213 provided in the first circumferential narrow main groove 21A, in a case where either one side in the tire width direction is defined as the outer side, the other side is defined as the inner side, and each notch portion bulges independently.

In the present embodiment, as illustrated in FIG. 8, the notch portions 213 are each formed so as to bulge toward one side in the circumferential narrow main groove 21 in the tire width direction, that is, on only the side connected to each of the sipes 24. Therefore, as compared with a configuration in which the notch portion bulges on both sides in the tire width direction with the circumferential narrow main groove interposed therebetween, the groove wall of the circumferential narrow main groove 21 on the side where the notch portion 213 does not bulge supports the bulging groove wall due to the notch portion 213. As a result, reduction in block rigidity can be suppressed and the rolling resistance can be reduced.

In a case where the maximum length in the tire circumferential direction of the ground contact surface of the tread portion 20A is defined as a ground contact length L1 (not illustrated), a ratio (L1/P2) of this ground contact length L1 to the pitch length P2 of the zigzag shape described above is in the range of 2.5≤(L1/P2)≤4.0. Note that the ground contact surface refers to a region in which the tire 1 contacts a flat plate when the tire 1 is mounted on a specified rim, inflated with a specified internal pressure, placed perpendicularly to the flat plate in a stationary state, and applied with a load corresponding to a specified load. In the present embodiment, since at least five notch portions 213 are provided in the pitch length P2 of the zigzag shape, when the ground contact length L1 and the pitch length P2 of the zigzag shape described above are in the range of 2.5≤(L1/P2)≤4.0, the number of the notch portions 213 in the ground contact surface of one circumferential narrow main groove 21 can be set to be 10 or more and 20 or less. As a result, it is possible to define a numerical range in which the wet traction performance can be improved in a range in which the rolling resistance does not deteriorate.

Note that in the present embodiment, a configuration in which the zigzag shape is formed by alternately connecting the long portion and the short portion has been described, but the zigzag shape is not limited thereto, and a zigzag shape may be formed by alternately connecting portions having equal lengths. Additionally, in the present embodiment, the notch portion 213 is provided at the intersection point 214 of the long portion and the short portion, but the notch portion 213 may naturally be provided in the long portion near the intersection point 214.

EXAMPLES

FIGS. 9A-9C include a table showing the results of performance tests of the pneumatic tire according to the present embodiment. In the performance test, the rolling resistance performance and the wet traction performance are evaluated for a plurality of types of test tires. The size of the pneumatic tire 1 used for evaluation is 275/80R22.5. The vehicle used for evaluation is a vehicle in which a trailer is connected to a 6×4 tractor.

An indoor drum testing machine is used to evaluate the rolling resistance performance. In the evaluation of the rolling resistance performance, the test tires are inflated to the specified internal pressure, and the resistance at a load of 31.26 kN and a speed of 80 km/h is measured. The measurement results are expressed as index values and evaluated with Conventional Example being assigned as the reference (100). In the evaluation, larger index values indicate less rolling resistance and thus superior rolling resistance performance.

In the evaluation of wet traction performance, the test tire is mounted on a rim, inflated to an air pressure of 900 kPa, and mounted on a drive shaft of a tractor head, and the wet braking performance is evaluated. In the evaluation of wet braking performance, deceleration G is measured in a test course when a test vehicle having the test tire mounted thereon decelerates from an initial speed of 60 km/h to 20 km/h on a road surface, with water sprayed to a depth of approximately 1 mm. The measured decelerations G are expressed as index values and evaluated with Conventional Example being assigned as the reference (100). In the evaluation, larger values indicate shorter braking distance and superior wet braking performance, that is, wet traction performance.

As illustrated in FIGS. 9A-9C, in the test tires of Conventional Example and Examples 1 to 15, the shape of the circumferential narrow main groove, the presence/absence of notches that bulge toward one side with the circumferential narrow main groove interposed therebetween, the opening area of the notch portion, the ratio (Wa/W1) of the width Wa of the notch portion to the groove width W1 of the circumferential narrow main groove, the number of the notch portions provided in the circumferential narrow main groove in the ground contact surface of the tread portion, the ratio of the number of the notch portions on the outer side in the tire width direction of one circumferential narrow groove to the number of the notch portions on the inner side, and the like are different. Note that in the test tires of Conventional Example, the straight-shaped circumferential narrow main groove is provided with a widened portion, but the notch portion of the portion connecting the circumferential narrow main groove and the sipe bulges toward both sides with the circumferential narrow main groove interposed therebetween.

As the result of the performance evaluation tests performed using these test tires, as illustrated in FIGS. 9A-9C, the test tires of Examples 1 to 15 can reduce the rolling resistance and improve the wet braking performance as compared with Conventional Example. In particular, it is possible to achieve a great improvement in wet braking performance.

Embodiments of the present technology have been described above, but the present technology is not limited to the embodiments described above. For example, in the present embodiment, a pneumatic tire has been described as an example of a tire, but the present technology is not limited to this, and the present embodiment can naturally be applied to a tire that is not filled with air, such as an airless tire. In addition, an inert gas such as nitrogen, argon, and helium in addition to ordinary air or air with an adjusted oxygen partial pressure can be used as the gas to be filled in the pneumatic tire illustrated in the present embodiment.

The invention claimed is:

1. A tire, comprising:
one or more circumferential narrow grooves extending in a tire circumferential direction and having a groove width of an opening portion open to a surface of a tread portion being greater than 1.0 mm and 4.0 mm or less; and
a plurality of width-direction sipes communicating with the one or more circumferential narrow grooves from both sides in a tire width direction of the one or more circumferential narrow groove,
at least one of the one or more circumferential narrow grooves comprising:
a widened portion provided in a region in which a groove depth from the surface of the tread portion is 30% or more of a maximum groove depth and having a groove width wider than the opening portion; and
a plurality of notch portions provided at intervals in the tire circumferential direction to bulge toward only one side in the tire width direction to communicate from the surface of the tread portion to the widened portion, and
the width-direction sipe being connected to at least one of the notch portions; wherein
a number of the notch portions provided in one of the one or more circumferential narrow grooves is 10 or more and 20 or less in a ground contact surface of the tread portion,
a number of the width-direction sipes communicating with the one of the one or more circumferential narrow grooves from one side in the tire width direction is different than a number of the width-direction sipes communicating with the one of the one or more circumferential narrow grooves from an other side in the tire width direction, along an entire circumference of the tire,
a number of the width direction sipes on one side of a tire equatorial plane is the same as a number of the width direction sipes on an opposite side of the tire equatorial plane, and
a pitch of the width-direction sipes communicating with the one of the one or more circumferential narrow grooves from the one side in the tire width direction is P and a pitch of the width-direction sipes communicating with the one of the one or more circumferential narrow grooves from the other side in the tire width direction is P/2.

2. The tire according to claim 1, wherein an opening area of each of the notch portions in the surface of the tread portion is 1.5 mm$^2$ or more and 10.0 mm$^2$ or less.

3. The tire according to claim 1, wherein a width Wa of each of the notch portions and a groove width W1 of the opening portion are in a range of $0.5 \leq (Wa/W1) \leq 2.0$.

4. The tire according to claim 1, wherein a ratio of a number of the notch portions bulging toward an inner side to a number of the notch portions bulging toward an outer side in the tire width direction of the at least one of the circumferential narrow grooves, among the notch portions provided in the at least one of the circumferential narrow grooves, is 0.2 or more and 1.0 or less.

5. The tire according to claim 1, wherein
a maximum groove width W2 of the widened portion and a groove width W1 of the opening portion are in a range of $1.0 < (W2/W1) \leq 4.0$, and
a width Wb from the opening portion to the widened portion and a width Wa of each of the notch portions are in a range of $0.5 \leq (Wa/Wb) \leq 2.0$.

6. The tire according to claim 1, wherein a groove depth H4 of the width-direction sipe satisfies a relationship of $H3 < H4 < 0.9\ H1$, with respect to: a depth H3 from the surface of the tread portion in the at least one of the circumferential narrow grooves to a connection portion between one of the notch portions and the widened portion; and the maximum groove depth H1 of the at least one of the circumferential narrow grooves.

7. The tire according to claim 1, wherein
the width-direction sipe is provided with a widened sipe with a widened width at a groove bottom, and
a maximum width and a height from a bottom surface of the widened sipe are 1.2 times or more and 3.0 times or less of a groove width on the surface of the tread portion.

8. The tire according to claim 1, wherein
a pair of circumferential main grooves extending in the tire circumferential direction are disposed in the tread portion on an outer side in the tire width direction with the one or more circumferential narrow grooves interposed therebetween,
a groove width W4 of the circumferential main groove with respect to a ground contact width TW of the tread portion is in a range of 3.0% or more and 5.0% or less, and
a width TWc in the tire width direction of a land portion defined by the pair of circumferential main grooves and the ground contact width TW are in a range of $0.50 \leq (TWc/TW) \leq 0.60$.

9. The tire according to claim 1, wherein the one or more circumferential narrow grooves each have a zigzag shape that is repeatedly and alternately bent in the tire width direction while extending in the tire circumferential direction.

10. The tire according to claim 9, wherein the one or more circumferential narrow grooves having the zigzag shape is formed by alternately connecting a long portion and a short portion.

11. The tire according to claim 10, wherein at least one of the notch portions is provided on a convex side of an intersection point of the long portion and the short portion.

12. The tire according to claim 10, wherein one or more of the notch portions are provided in one long portion and bulge toward each of an outer side and an inner side in the tire width direction.

13. The tire according to claim 10, wherein a pitch length P2 of the one or more circumferential narrow grooves having the zigzag shape and a length L2 of the long portion in the tire circumferential direction are in a range of $0.85 \leq (L2/P2) \leq 1.00$.

14. The tire according to claim 1, wherein the one or more circumferential narrow grooves comprises a plurality of circumferential narrow grooves, a pair of circumferential main grooves extending in the tire circumferential direction are disposed in the tread portion on an outer side in the tire width direction with the plurality of circumferential narrow grooves interposed therebetween, a first land portion defined by the plurality of circumferential narrow grooves is provided between the pair of circumferential main grooves, a second land portion is defined by one circumferential narrow groove of the plurality of circumferential narrow grooves and one main groove of the pair of circumferential main grooves, and a number N1 of first blocks dividing the first land portion by the width-direction sipe and being aligned in the tire circumferential direction and a number N2 of second blocks dividing the second land portion by the width-direction sipe and being aligned in the tire circumferential direction are in a range of $1.2 \leq (N2/N1) \leq 2.0$.

15. The tire according to claim 1, wherein a ratio of a number of the notch portions bulging toward an inner side to a number of the notch portions bulging toward an outer side in the tire width direction of the one of the one or more circumferential narrow grooves, among the notch portions provided in the at least one of the circumferential narrow grooves, is 0.2 or more and 0.8 or less, along an entire circumference of the tire.

\* \* \* \* \*